Patented Jan. 21, 1941

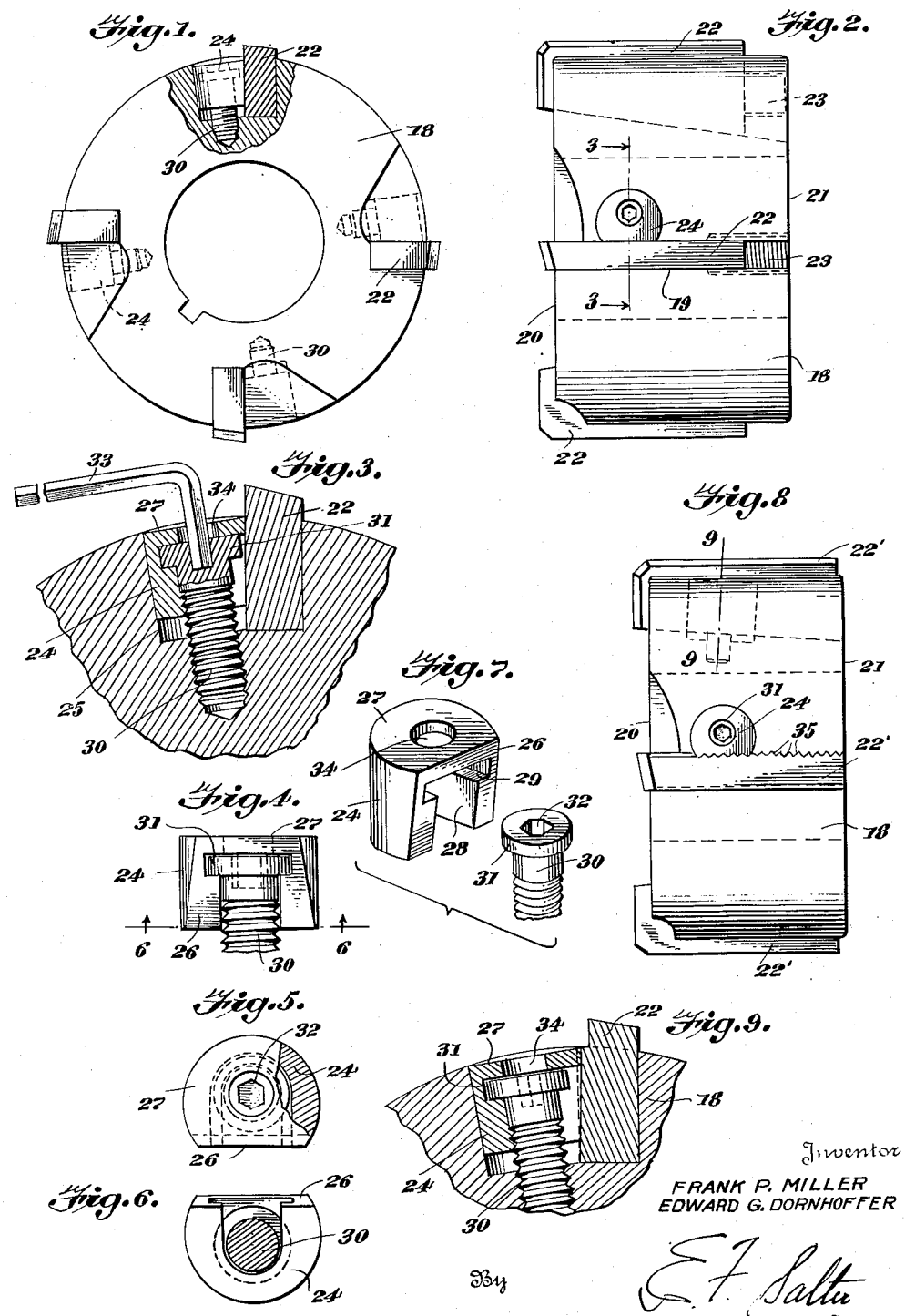

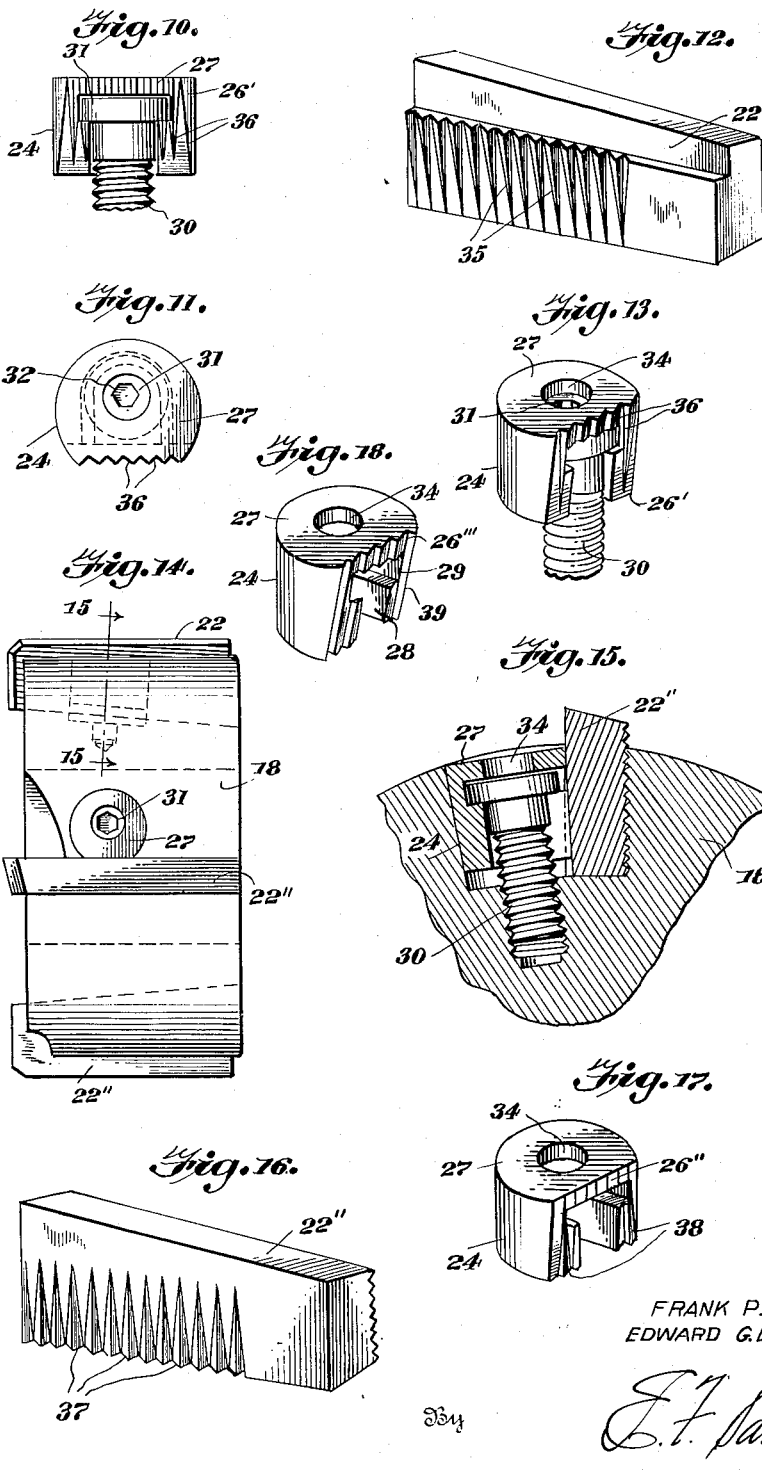

2,229,112

UNITED STATES PATENT OFFICE 2,229,112

INSERTED BLADE CUTTER

Frank P. Miller and Edward G. Dornhoffer, Meadville, Pa., assignors to McCrosky Tool Corporation, Meadville, Pa., a corporation of Pennsylvania Application May 27, 1939, Serial No. 276,244

18 Claims. (Cl. 29—105)

This invention relates to the art of inserted blade cutters, of which there are many types, and deals particularly with improved means for locking blades in operative position in cutter bodies.

An object of the invention is to provide in an inserted blade cutter a novel form of blade locking wedge and operating means therefor, so arranged that the operating means acts positively and equally in either direction of movement of the locking wedge when being advanced or retracted.

Another object is to provide a novel form of screw operable blade locking wedge having an operating screw detachably engageable therewith in swivelled relation and interlocked with the wedge through service engagement of the wedge against the face of a cutter blade with which it is associated.

Still another object is to provide in an inserted blade cutter a novel assembly of interfittingly serrated blade and locking wedge, so arranged that the blade is firmly locked against axial as well as radial movement relative to the cutter body when the wedge is advanced in its seat.

Other objects and advantages will be apparent from the description, and will be readily appreciated by those skilled in the art.

In the accompanying drawings wherein like characters of reference designate like parts throughout the several views:

Figure 1 is a front end elevation, partly in section, of a cutter equipped with blades and blade locking means in accordance with our invention.

Figure 2 is a side elevation thereof.

Figure 3 is a fragmentary section taken on the line 3—3 of Figure 2.

Figure 4 is a bearing face elevation of our improved wedge with its operating screw associated therewith.

Figure 5 is a top plan view, partly in section, of the wedge.

Figure 6 is a bottom plan view of the wedge.

Figure 7 is a group perspective view of the wedge and operating screw, illustrating the manner of their assembly.

Figure 8 is a side elevation of an alternative embodiment of the invention, in which the bearing face of the wedge and the adjacent face of the cutting blade are interfittingly serrated radially of the cutter body.

Figure 9 is a fragmentary section taken on the line 9—9 of Figure 8.

Figure 10 is a bearing face elevation of the wedge and operating screw of the embodiment shown in Figures 8 and 9.

Figure 11 is a top plan view of the wedge of Figure 10.

Figure 12 is a perspective view of a cutter blade serrated for engagement with the wedge of Figure 10.

Figure 13 is a perspective view of the assembled wedge and operating screw of Figure 10.

Figure 14 is a side elevation of a further alternative embodiment of the invention.

Figure 15 is a fragmentary section taken on the line 15—15 of Figure 14.

Figure 16 is a perspective view of a cutter blade serrated for engagement with the wedge shown in Figure 15.

Figure 17 is a perspective view of the wedge shown in Figure 15.

Figure 18 is a perspective view of a wedge that may be used, interchangeably, with either type of serrations on the leading face of the blade.

While the invention is illustrated in the accompanying drawings as applied to inserted blade cutters of the rotary type, it is to be understood that it is not restricted thereto but is capable of use in any type of inserted blade cutter. Also, within the scope of the invention as claimed, the details of its structure may be varied as desired.

In all embodiments of the invention herein disclosed the blade lock is obtained through the agency of a wedge that moves inwardly of the cutter body when advanced to locking position. A wedge of this type possesses many advantages over a wedge which moves outwardly to effect a lock; one in particular being that the inward movement of the wedge draws the blade in with it and forces the blade against the bottom of its slot, so that it is fully seated. Heretofore in the art it has been found exceedingly difficult to withdraw such wedges. To overcome this difficulty an interlocking assembly of wedge and operating screw has been developed, but the assemblies known to the art prior to the advent of this invention require the use of tools in assembling the wedge and screw and in dismantling same. The present invention provides a construction which is powerful in its action, and comprises a simple interlocking assembly of wedge and operating screw in which the parts are very easily assembled and disassembled, and wherein they are held assembled by the presence of a cutter blade with which the wedge is associated in service.

As shown in Figures 1 to 7, the invention comprises a rotary cutter whose body 18 is provided with a series of radial blade receiving slots 19 which open to the periphery of the cutter body and to its front and rear faces 20 and 21, respectively. Preferably, although not necessarily, the bottom of each blade slot is inclined radially outwardly from the rear face of the cutter body to its front face, and the inserted blades 22 have complemental inclined bottom edges whereby both radial and axial adjustment of the blade is obtainable. Back-up screws 23 are provided for the individual blades to positively prevent rearward displacement thereof from severe cutting thrusts and also to afford a convenient, easy and accurate adjustment of each individual blade. The blades are rectangular in cross section and have plane side faces, and they are locked in their respective slots by means of wedges 24 which seat in conforming sockets 25 at the front or work engaging side of each blade, with the sockets opening laterally through the adjacent slot wall.

Each wedge member 24 is substantially cylindrical except that a flat bearing face 26 is formed at one side thereof in a plane inwardly angled with respect to the axis of the wedge from its top 27 to its bottom as a chord of the circle comprised by the periphery of the wedge member. One side wall of the wedge, preferably the flat bearing face 26, is slotted inwardly with a T-slot rounded at its inner end on an axis which coincides with the axis of the wedge. The shank portion 28 of the slot opens through the bottom of the wedge, and its head portion 29 is disposed axially inwardly of the wedge top 27 and parallel therewith. The cross sectional area of the slot is of proper dimensions to receive in laterally slidable engagement a wedge operating screw 30 having a threaded shank which seats within the shank portion 28 of the wedge slot and extends axially beyond the bottom or inner end of the wedge. The screw is formed with a short head 31 which engages the head portion 29 of the wedge slot and interlocks the wedge and screw against relative axial movement while permitting free rotatable as well as lateral sliding movement. A wrench socket 32 is provided axially through the screw head into the shank portion of the screw and is accessible to a wrench, as at 33, inserted axially through an aperture 34 extending through the top face 27 of the wedge to the slot head portion 29.

By this arrangement the screw head is housed within the wedge and is protected from damage. Also, the head of the screw is made very short so that the amount of bearing surface sacrificed on the wedge is reduced to a minimum, and ample material is left in the wedge to provide adequate strength.

The bottom of the wedge socket 25 is bored radially inwardly of the cutter body on the axis of the screw 30 and is threaded to receive the shank of the screw when engaged therewith; ample threaded engagement being provided to insure positive and powerful action in moving the wedge in either an advancing or retracting direction.

In service, the blades are properly adjusted in their slots and the lock wedges are advanced by operation of the screws 30. The action of the screws is to pull the wedges inwardly or downwardly with respect to the cutter body, with their flat faces 26 bearing against the adjacent blades and exerting a powerful lateral wedging action which forces the rear face of each blade firmly against the adjacent side wall of its slot. At the same time the tractive effect of the wedge pulls the blade down in its slot and forces it firmly against the slot bottom; a highly desirable feature. The wedge and screw are associated in swivelled relationship, as an assembled unit, and the assembly is obtained by the simple expedient of sliding the screw laterally into the wedge. No holding washers, retaining rings or the like are required in effecting the interlock between the wedge and its operating screw.

When the operating screw is retracted, the wedge is forced axially out of its socket with the same power and ease with which it is pulled in, and by the same tool. The necessity of using a hammer or a drift is entirely eliminated.

In the embodiment shown in Figures 8 to 13, inclusive, the wedge is adapted for use in connection with a blade 22' of the type disclosed in U. S. Patent No. 1,736,273, of Nov. 19, 1929. In this form of the invention the outer portion of the blade 22', which extends radially beyond the periphery of the cutter body, is reduced in thickness, and the leading side face of the blade is provided with vertical or radial serrations 35 which are increased in depth gradually and uniformly from the bottom edge of the blade towards its outer or top edge. In conformity with this arrangement, the bearing face 26' of the wedge is provided with complemental serrations 36 which deepen toward the top face 27 of the wedge. In all other respects the details of the assembly are identical with the form previously described, and like parts have been designated by like reference characters in order to prevent prolixity of description. The use of vertical serrations on the blade and wedge is of advantage in holding the blade in positive axial positions of adjustment, and at the same time the blade is pulled down against the bottom of its slot and held by the dovetailing effect secured through the tapered depth of the interfitting serrations.

The embodiment illustrated in Figure 14 through 17 is identical with the preceding forms except that the blades 22" have their trailing faces formed with horizontal serrations, or substantially so, to mesh with complemental serrations on the adjacent wall of the blade slot, and the leading face of each blade is formed with vertical serrations 37 which decrease gradually and uniformly in depth from the bottom edge of the blade toward its upper edge, terminating short of the latter. In this form, the wedge has its bearing face 26" formed with complemental vertical serrations 38 which likewise decrease in depth from bottom to top. By having the serrations 37 on the blade decrease in depth as they approach the periphery of the cutter body or the upper edge of the blade it is possible to form the serrations on a plain blade which is rectangular in cross section, without having a shoulder on its leading face. This avoids one operation on the blade and makes it more simple and less expensive to produce. The combination of the vertical and horizontal serrations insures the blade being held in positive and powerful locked position in all directions and also provides for easy and accurate adjustment both axially and radially. Those parts identical with like parts in the preceding forms are designated by like reference characters.

The wedge illustrated in Figure 18 is intended for interchangeable use with either a blade as shown in Figure 12 or as shown in Figure 16, in each of which the leading face is serrated. In all respects the wedge is identical with the previously described wedges except that its bearing face 26''' is formed with vertical serrations 39 which are of uniform and equal depth from one end to the other. The wedge parts corresponding to the preceding forms are identified by corresponding reference characters.

We claim:

1. An inserted blade cutter comprising a body having a slot and a socket opening through one side wall of the slot, a blade in the slot, a wedge member movable axially in the socket to bear on the adjacent face of the blade, said member having a slot therein opening through a side wall thereof, and an operating screw slidably engageable in said slot for swivelled interlocking connection with said wedge member.

2. An inserted blade cutter comprising a body having a slot and a socket opening through one side wall of the slot, a blade in the slot, a wedge member movable axially in the socket to bear on the adjacent face of the blade, said member having a T-slot therein opening through a wall thereof, a headed operating screw slidably engageable with said T-slot for swivelled interlocking connection with the wedge member and projecting axially from the wedge bottom, said projecting portion of the screw having a threaded engagement in the wedge socket bottom, and said wedge member being axially apertured from its top face to said T-slot to permit operating access to said screw.

3. An inserted blade cutter comprising a body having a slot and a socket opening through one side wall of the slot, a blade in the slot, a wedge member movable axially in the socket to bear on the adjacent face of the blade, said member having a T-slot therein opening through a wall thereof and rounded at its inner end on the axis of the wedge member, the shank of said slot opening through the wedge member bottom and the head of said slot being disposed axially inwardly of and parallel with the wedge member top, the top of said wedge member being axially apertured in communication with the head of said T-slot, and a headed operating screw insertable laterally in said T-slot in swivelled interlocking engagement with the wedge member.

4. An inserted blade cutter comprising a body having a slot and a socket opening through one wall of the slot, a blade in the slot, a wedge member movable axially in the socket and having a blade bearing face, said member having a T-slot therein extending to its axis from and through the bearing face, the shank of said slot opening through the wedge member bottom and the head of the slot being disposed axially inwardly of and parallel with the wedge member top, the head of said wedge member being axially apertured in communication with the head of said T-slot, a headed operating screw insertable laterally in said T-slot in swivelled interlocking engagement with the wedge member, and the head portion of said screw having an axially extending tool receiving socket therein for alignment with the aperture in the top of said wedge member.

5. Blade locking means for inserted blade cutters, comprising a substantially cylindrical wedge member, a screw housing slot in the axis thereof and opening to and through one side of the member and through its bottom, and a short-headed operating screw insertable laterally in said slot with its shank projecting below the bottom of the wedge member, said wedge member being axially apertured from its top face to said slot to permit operating access to said screw.

6. Blade locking means for inserted blade cutters, comprising a substantially cylindrical wedge member, a screw housing T-slot in the axis thereof and opening to and through one side of the member, the shank portion of said slot opening through the bottom of said member, a short-headed operating screw insertable laterally in said slot in swivelled interlocking engagement with the wedge member, and the end of the screw projecting beyond the bottom of the wedge member, said wedge member being axially apertured from its top face to said T-slot to permit operating access to said screw.

7. Blade locking means for inserted blade cutters, comprising a substantially cylindrical wedge member, a screw housing T-slot in the axis thereof and opening to and through one side of the member with the shank portion of the slot opening through its bottom and the head portion of the slot disposed axially inwardly of and parallel with the top of the member, an operating screw insertable laterally in said slot in swivelled interlocking connection with the wedge member, and one side of said wedge member being cut away to provide a bearing face disposed substantially in a plane angled with respect to the axis of the wedge member, said wedge member being axially apertured from its top face to said T-slot to permit operating access to said screw.

8. Blade locking means for inserted blade cutters, comprising a substantially cylindrical wedge member, a screw housing T-slot in the axis thereof and opening to and through one side of the member with the shank portion of the slot opening through its bottom and the head portion of the slot disposed axially inwardly of the top face of the member, the top of said member being axially apertured in communication with the head portion of said slot, and said member having a blade contacting face disposed in a plane convergent to the axis of the member from its top to its bottom.

9. Blade locking means for inserted blade cutters, comprising a substantially cylindrical wedge member, a screw housing T-slot in the axis thereof and opening to and through one side of the member with the shank portion of the slot opening through its bottom and the head portion of the slot spaced inwardly from the top face of the member, the top of said member being apertured in communication with the head portion of the slot, and the side of said member through which the slot opens being formed as a substantially flat blade bearing face inclined with respect to the axis of the member in a plane disposed as a chord of the circle defined by the periphery of said member.

10. Blade locking means for inserted blade cutters, comprising a substantially cylindrical wedge member, a screw housing T-slot in the axis thereof and opening to and through one side of the member with the shank portion of the slot opening through its bottom and the head portion of the slot being spaced inwardly of the top face of the member, one side of said member being formed as a planal bearing face angled with respect to the axis of the member, and said bearing face being formed with serrations gradually increased in depth from one end toward the other.

11. An inserted blade cutter comprising a body having a slot and a socket communicating with said slot, a blade in said slot, a wedge in said socket and having pressure engagement with said blade, said blade and said wedge being provided with interfitting radially extending serrations increased in depth from one end toward the other, said wedge having a T-slot opening through a side wall thereof, and a wedge operating screw in said T-slot and having threaded engagement with said cutter body.

12. An inserted blade cutter comprising a body having a slot and a socket opening through one wall of said slot, a blade in said slot, a wedge in said socket in pressure engagement with said blade, said blade and said wedge being provided with interfitting radially extending serrations increased in depth toward the outer ends thereof to resist outward shifting of the blade, said wedge having a T-slot opening through a side wall thereof and being axially apertured from its top face to the T-slot, and a wedge operating screw in said T-slot and having threaded engagement with said cutter body.

13. An inserted blade cutter comprising a body having a slot and a socket communicating with said slot, a blade in said slot, said blade and one wall of said slot being provided with interfitting axially extending serrations, a wedge in said socket in pressure engagement with said blade, said blade and said wedge being formed with interfitting radially extending serrations increased in depth from one end toward the other, said wedge having a T-slot opening through one side wall thereof and being axially apertured from its top face to the T-slot, and a wedge operating screw in said T-slot and having threaded engagement with said cutter body.

14. An inserted blade cutter comprising a body having a slot and a socket communicating with said slot, a blade in said slot, said blade and one wall of said slot being provided with interfitting axially extending serrations, a wedge in said socket in pressure engagement with said blade, said blade and said wedge being formed with interfitting radially extending serrations increased in depth toward the inner ends thereof, said wedge having a T-slot opening through one side wall thereof and being axially apertured from its top face to the T-slot, and a wedge operating screw in said T-slot and having threaded engagement with said cutter body, the radially extending serrations on said blade terminating short of the upper edge thereof.

15. An inserted blade cutter comprising a body having a slot and a socket communicating with said slot, a blade in said slot, said blade and one wall of said slot being provided with interfitting axially extending serrations, a wedge in said socket in pressure engagement with said blade, said blade and said wedge being formed with interfitting radially extending serrations increased in depth from one end toward the other, and an operating screw for said wedge having threaded engagement with said cutter body, the radially extending serrations on said blade terminating short of the upper edge thereof.

16. An inserted blade cutter comprising a body having a slot and a socket communicating with said slot, a blade in said slot, said blade and one wall of said slot being provided with interfitting axially extending serrations, a wedge in said socket in pressure engagement with said blade, said blade and said wedge being formed with interfitting radially extending serrations increased in depth toward the inner ends thereof, and an operating screw for said wedge having threaded engagement with said cutter body, the radially extending serrations on said blade terminating short of the upper edge of the blade and in the plane thereof.

17. Blade locking means for inserted blade cutters, comprising a substantially cylindrical wedge member, a screw housing T-slot in the axis thereof and opening to and through one side of the member with the shank portion of the slot opening through its bottom and the head portion of the slot being spaced inwardly of the top face of the member, one side of said member being formed as a bearing face angled with respect to the axis of the member, and said bearing face having serrations extending from the top to the bottom face of the member.

18. Blade locking means for inserted blade cutters, comprising a substantially cylindrical wedge member, a screw housing T-slot in the axis thereof and opening to and through one side of the member with the shank portion of the slot opening through its bottom and the head portion of the slot being spaced inwardly of the top face of the member, one side of said member being formed as a bearing face angled with respect to the axis of the member, and said bearing face having parallel serrations of equal and uniform depth from the top to the bottom face of the member.

FRANK P. MILLER.
EDWARD G. DORNHOFFER.